United States Patent

Bunting et al.

[11] Patent Number: 5,601,477
[45] Date of Patent: Feb. 11, 1997

[54] POLYCRYSTALLINE ABRASIVE COMPACT WITH HONED EDGE

[75] Inventors: John A. Bunting, Provo; Kenneth M. Jensen, Orem, both of Utah

[73] Assignee: U.S. Synthetic Corporation, Orem, Utah

[21] Appl. No.: 214,946

[22] Filed: Mar. 16, 1994

[51] Int. Cl.$^6$ ........................................ B24B 1/00
[52] U.S. Cl. ............................ 451/59; 451/44; 76/108.2
[58] Field of Search ................................ 451/555, 554, 451/552, 540, 321, 320, 312, 45, 371, 319, 59, 44; 51/307, 309; 175/420.2, 434, 428; 76/108.1, 108.2, DIG. 11

[56] References Cited

U.S. PATENT DOCUMENTS

| | | | |
|---|---|---|---|
| 3,871,139 | 3/1975 | Rands | 451/466 |
| 3,969,090 | 7/1976 | Sasena et al. | 451/532 |
| 4,109,737 | 8/1978 | Bovenkerk | 175/329 |
| 4,646,479 | 3/1987 | Walker et al. | 451/466 |
| 4,987,800 | 1/1991 | Gasan et al. | 76/108.2 |
| 5,016,718 | 5/1991 | Tandberg | 175/333 |
| 5,106,391 | 4/1992 | Lloyd | 51/309 |
| 5,120,327 | 6/1992 | Dennis | 76/DIG. 12 |
| 5,159,857 | 11/1992 | Jurewicz | 76/DIG. 12 |
| 5,187,904 | 1/1992 | Tyler et al. | 451/526 |
| 5,355,750 | 10/1994 | Scott et al. | 76/DIG. 12 |
| 5,460,233 | 10/1995 | Meany et al. | 175/428 |

*Primary Examiner*—Bruce M. Kisliuk
*Assistant Examiner*—Andrew Weinberg
*Attorney, Agent, or Firm*—Thorpe North & Western, L.L.P.

[57] ABSTRACT

A compact cutter for drilling or cutting material, such as rock, is formed from a substrate of tungsten carbide, or other hard substance, bonded to a polycrystalline layer which includes an upper, generally planar cutting surface. The corner formed by the cutting surface and the sides of the polycrystalline layer is rounded by honing to remove cracks and other irregularities and to eliminate the need for chamfering the corner.

2 Claims, 1 Drawing Sheet

5,601,477

POLYCRYSTALLINE ABRASIVE COMPACT WITH HONED EDGE

BACKGROUND OF THE INVENTION

The present invention relates to diamond abrasive compacts and cutters, and in particular to such compacts which have improved fracture resistance.

Polycrystalline diamond compacts, cutters, inserts, and various cutting tools (hereinafter referred to as "compacts") are now in wide use both in oil field drill bits and as machine cutting tools. The compacts are fabricated with a polycrystalline diamond layer bonded to a tungsten carbide substrate by the application of high pressure and temperature in a manner well known to those skilled in the art.

Compacts make highly abrasive-resistant cutters for drilling through rock and cutting through other hard material. The compacts are generally cylindrical with the diameter of the polycrystalline material coextensive with the diameter of the substrate, and the polycrystalline cylinder terminating at right angles with an upper cutting surface. The edge or corner formed by the described right angle is widely used as a cutting edge.

The cutting edge of conventional compacts are formed by a number of grinding or lapping processes. One approach is to use electrical discharge grinding to grind the polycrystalline diamond surface of the compact substantially flat followed by centerless grinding of the peripheral edge of the diamond layer. Another approach is to use free abrasive lapping to prepare the polycrystalline diamond surface, followed by centerless grinding to finish the peripheral edge. These processes invariably leave microfractures or cracks and irregularities that can readily be seen at 20× magnification at the cutting edge of the compact.

In cutting rock and hard materials such as those commonly encountered in oil field drilling, the sharp edge of the compact is exposed to intermittent cutting forces of a magnitude related to the compressive strength of the rock formation being drilled. When these cutting forces act on the microfractures and irregularities of the compact cutting edge, cracks develop in the polycrystalline diamond layer leading to chipping and spalling of the cutting edge, accelerated edge wear, and in some cases mechanical failure of the compact. This process can further lead to failure of the drilling or cutting implement due to loss of symmetry or balance, and the increased incidence of random abrasive material within the working environment due to the failure of other components.

One approach to minimizing the effects of these irregularities is to chamfer or bevel the corner at some intermediary angle. This allows the applied forces in rock drilling to be spread over a larger area of the compact, making it less likely that a crack would initiate from the microfractures or irregularities found at the compact cutting edge. However, chamfering the cutting edge corner creates new problems. First it requires a significant increase in the cutting forces required to penetrate the worked material. This is due to the increase in degree of attack of the cutting edge of the polycrystalline layer, in effect, making the edge appear dull to the working surface. For example, an unchamfered edge presents a 90 degree edge and an implement chamfered at 45 degrees presents a 135 degree edge. (See FIG. 2 and FIG. 5). Thus, to maintain the same drilling rate, cutting force pressures must be increased to compensate for the lack of a sharp edge in the chamfered compact. The resulting increase in cutting force causes increased abrasion, and a complementary increase in temperatures, all leading to faster wear and shorter tool life.

The effective rake angle becomes more negative with chamfering (–65 degrees compared to only –20 degrees for an unchamfered piece). This similarly requires an increase cutting force to cause failure in the rock. Wear, temperature and friction problems similar to those described above result, in addition to increased drag on the tool.

Further, chamfering decreases the total mass of polycrystalline material of the compact, and this decreases the effective work life of the tool.

Finally, chamfering also creates two new relatively sharp angles which also contain microcracks and irregularities, leading to rapid failure.

SUMMARY OF THE INVENTION

It is an object of the invention to provide an improved polycrystalline abrasive compact in which microcracks and surface irregularities at the edge or corner of the cutting surface perimeter are reduced.

It is an additional object of the invention to provide such an abrasive compact which allows for an increased angle of attack at the cutting edge.

It is a further object of the invention to provide such an abrasive compact with reduced back rake and drag.

It is yet another object of the invention to provide such an abrasive compact which allows for increased polycrystalline material volume.

The above and other objects are realized in a specific illustrative embodiment of the invention in which the edge or corner formed at the perimeter of a polycrystalline layer of an abrasive compact is honed to produce a slightly rounded but still relatively sharp cutting angle. The improved compact with honed edge removes surface irregularities which lead to crack propagation and stress concentration, thereby decreasing critical failure rates. Also, less polycrystalline material need be removed and the effective rake angle is improved relative to that of a chamfered corner.

BRIEF DESCRIPTION OF THE DRAWINGS

The above and other objects, features and advantages of the invention will become apparent from a consideration of the following detailed description presented in connection with the accompanying drawing in which.

DETAILED DESCRIPTION

Figure 3:
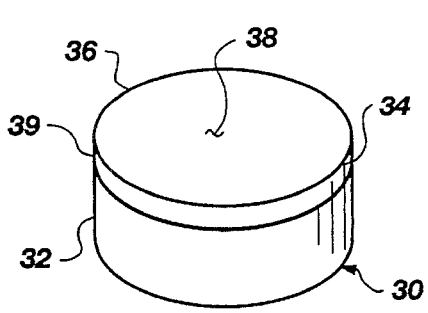
FIG. 3 is a perspective view of an improved polycrystalline abrasive compact made in accordance with the principles of the present invention.
Figure 4:
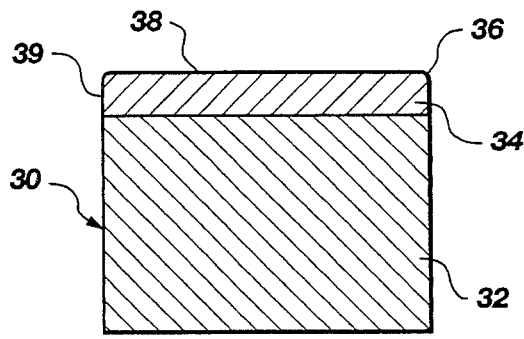
FIG. 4 is a side, cross-sectional view of the compact of FIG. 3.
Figure 5:
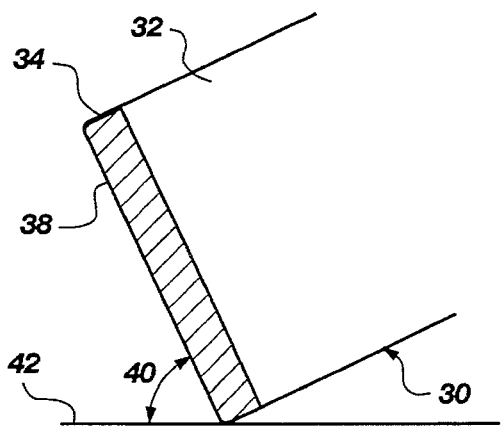
FIG. 5 is a side, cross-sectional view of the compact of FIG. 3 in a cutting position.

A polycrystalline diamond layer (such as 34 in FIGS. 3–5) can be applied in almost any conventional manner. It has long been known that polycrystalline materials can be bonded to a substrate forming a compact. This is often accomplished by sintering the polycrystalline material directly onto a substrate of cemented tungsten carbide by means of high pressure and temperature. This bonding can be accomplished with the same high pressure and temperature cycles used to create the polycrystalline material from separate crystals. An advantage of high temperature and pressure cycling in which the polycrystalline material is created by sintering and simultaneously bonding to the substrate, is that the catalyst/binder, such as cobalt, from the substrate "sweeps" through the polycrystalline material during the process, effectively catalyzing the sintering process.

For more detailed descriptions of methods for applying the polycrystalline diamond layer to the substrate, see U.S. Pat. Nos. 3,745,623; 3,767,371; 3,871,840, 3,841,852; 3,913,280 and 4,311,490.

Figure 1:
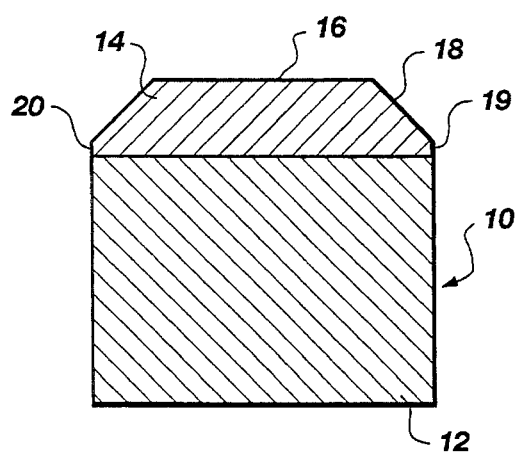
FIG. 1 is a side, cross-sectional view of a prior art chamfered polycrystalline abrasive compact.
Figure 2:
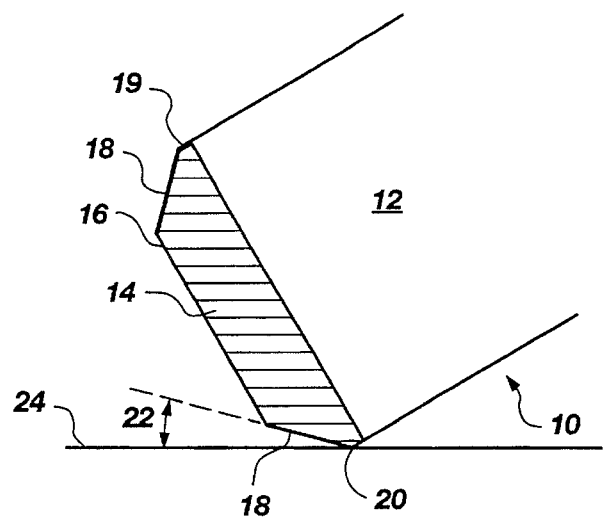
FIG. 2 is a side, cross-sectional view of the prior art compact of FIG. 1 in a cutting position.

The prior art (of similarly numbered FIGS. 1 and 2) describes a compact 10 having a substrate 12 and an attached polycrystalline layer 14. The polycrystalline layer 14 includes a cutting surface 16.

The compact of the prior art is generally cylindrical, with the intersection of the cutting surface 16 and the perimeter being chamfered, as shown at 18. The chamfer 18 is generally ground into the compact at a 45 degree bevel, and extends into the diamond 1/3 to 1/4 the thickness of the polycrystalline layer 14. This is done by applying a diamond grinding wheel to the periphery of the compact while the compact is rotated in a work head. The intersection of the chamfer 18 and the cylindrical side 19 forms a corner 20 where the compact contacts a working surface (24 of FIG. 2). In the prior art the angle 22 formed between the working surface 24 and the chamfer 18 (FIG. 2) is approximately 25 degrees when the compact has a negative rake angle of 20 degrees. This relatively low angle of attack causes, as above described, friction, drag, and heat buildup, all leading to eventual failure of the tool.

By contrast, the improved polycrystalline abrasive compact 30 (FIGS. 3-5) is not chamfered as is the prior art (although the honing approach of the present invention could be readily applied to chamfered prior art compacts to improve the characteristics of the compacts. A polycrystalline layer 34 is disposed on a substrate 32 in a conventional manner, to form the compact. A corner 36 is formed between an upper surface 38 of the polycrystalline layer 34 and a cylindrical side 39—this corner may have irregularities and cracks upon manufacture. The corner 36 is then honed, for example, with a diamond coated nylon brush wheel. A non-rigid honing device is used so as to leave a slightly rounded, non-chamfered corner. The corner 36 is only honed to the depth necessary to remove irregularities and microfractures, to form an approximately 0.001" radius of curvature (between 0.0001 and 0.005 inches), and this leaves substantially all of the polycrystalline material. It also leaves a corner 36, which approaches a working surface (42, FIG. 5) so as to form an angle 40 of about 70 degrees between the upper surface 38 and working surface 42, when the compact 30 is angled at about 20 degrees with the working surface 42.

Specific Examples of Application

Several compacts were sintered in a high pressure/high temperature apparatus and subsequently finished to final size. The polycrystalline (diamond) surface was lapped until flat, at which point the outer diameter was centerless ground to provide a cylindrical outer surface. The substrate surface or end opposite the upper polycrystalline surface was then ground to the final required height. All pieces were processed in this manner.

Several finished compacts were then abrasion tested without being honed in accordance with the principles of the present invention. Testing consisted of using the compacts as cutting tools on a relatively homogenous sample of crab orchard sandstone rock on a lathe rotating at approximately 600 surface feet per minute. All tests were accomplished with uniform surface feed, depths of cut, and cutting speed to assure similar test conditions. After cutting the rock, volumes of rock and polycrystalline material removed were measured. The ratio of the volume of rock removed to the volume of polycrystalline material abraded (Vr/Vd) was calculated. Higher Vr/Vd ratios indicate higher performance of the compact in performing its intended function.

Other compacts from the same batch were then honed according to the principles of the present invention using a brush wheel having diamond coated nylon bristles, and then subjected to the same abrasion test as the conventional compacts, and results calculated. The respective results are:

| Edge Preparation | Abrasion Resistance Average (Vr/Vd) |
| --- | --- |
| Conventional | $3.16 \times 10^6$ |
| Prepared in accordance with the invention | $8.75 \times 10^6$ |

The compacts prepared in accordance with the foregoing methods were also visually inspected. The compacts prepared in accordance with the present invention had more uniform edges with fewer fractures and other defects. The absence of defects indicates that critical failure resistance properties are enhanced by application of the invention, including impact resistance.

Tests were also performed to determine the improvement, if any, of impact resistance on compacts pursuant to the present invention as described above. Compacts were taken from the same batch, and some were honed while others were not. All compacts were then bonded to a carbide stud for impact testing, and then impacted until more than 30 percent of the diamond cutting surface had been removed. The impact mechanism consisted of a weight dropped from various heights onto the compact edge, and an energy level determined when the compact failed. The results are shown below:

| COMPACT TYPE | FAILURE ENERGY |
| --- | --- |
| Conventional | 25 Joules |
| Honed in accordance with present invention | 32 joules |

A 28 percent increase in impact strength was observed for the honed compacts.

It is to be understood that the above-described arrangements and examples are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of manufacturing polycrystalline abrasive compacts comprising:

(a) providing a tungsten carbide substrate;

(b) applying a polycrystalline diamond layer onto the tungsten carbide substrate to define a generally planar upper cutting surface formed at a substantially right angle with sides thereof; and (c) honing the junction of the polycrystalline diamond layer upper cutting surface and the sides with a flexible, non-rigid honing apparatus to form rounded corners.

2. A method of manufacturing polycrystalline abrasive compacts comprising:

(a) providing a tungsten carbide substrate;

(b) applying a polycrystalline diamond layer onto the tungsten carbide substrate to define a generally planar upper cutting surface formed at a substantially right angle with sides thereof; and (c) honing the junction of the polycrystalline diamond layer upper cutting surface and the sides with a rotating diamond coated nylon brush to form rounded corners.

* * * * *